Patented Sept. 22, 1925.

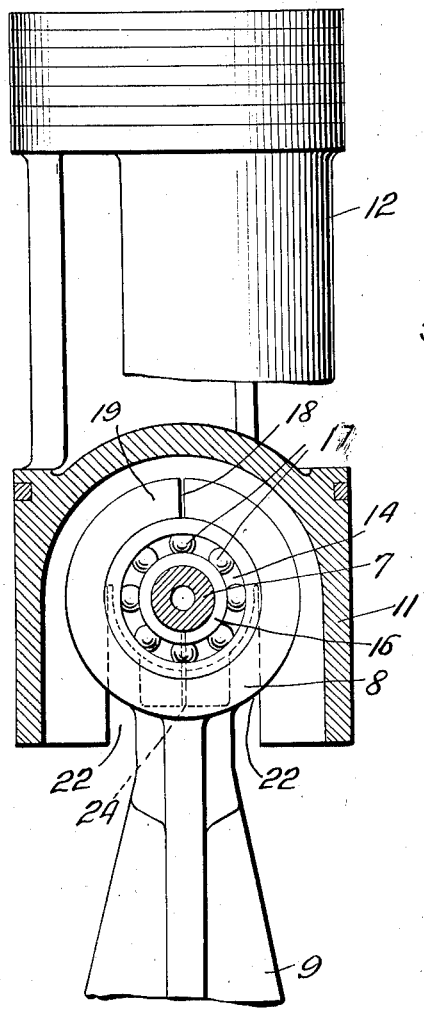
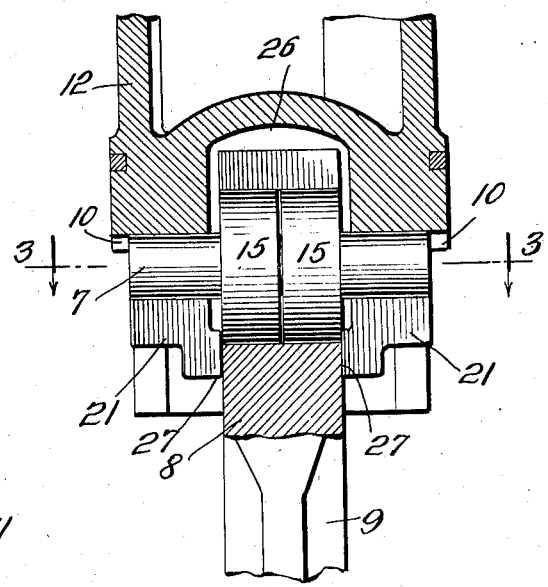
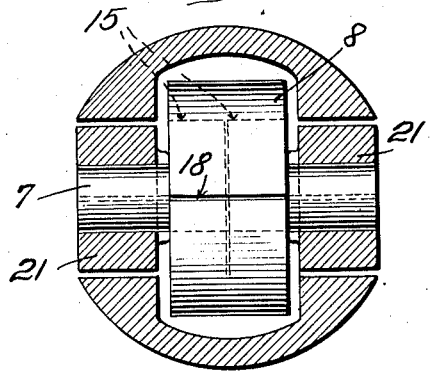

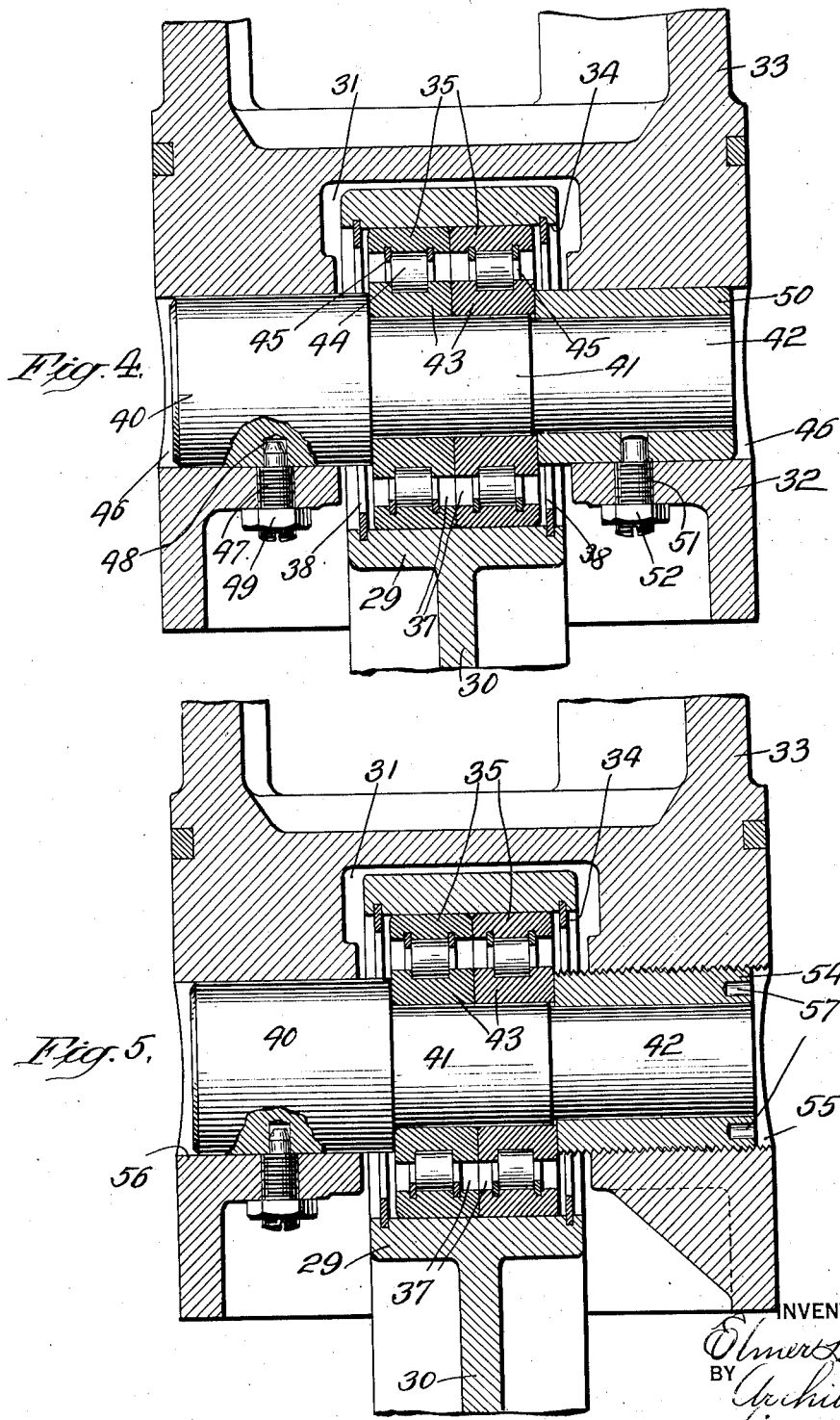

1,554,742

UNITED STATES PATENT OFFICE.

ELMER LOWE, OF NEW BRUNSWICK, NEW JERSEY, ASSIGNOR TO BRUNSWICK-KROESCHELL COMPANY, OF NEW BRUNSWICK, NEW JERSEY, A CORPORATION OF NEW JERSEY.

KNUCKLE-JOINT CONNECTION.

Application filed June 30, 1925. Serial No. 40,484.

*To all whom it may concern:*

Be it known that I, ELMER LOWE, a citizen of the United States, residing at New Brunswick, in the county of Middlesex, in the State of New Jersey, have invented certain new and useful Improvements in Knuckle-Joint Connections, set forth in the following specification.

The invention relates to knuckle joint connections, and more particularly to a knuckle joint connection between a piston and a member pivoted thereto.

The knuckle joint connection of the present invention is particularly applicable for use between a piston and an eccentric strap directly pivoted to the piston. In such uses the lower part or skirt of the piston is provided with a transverse hole which receives a wrist pin positioned transversely in the upper end or head of the eccentric strap. As heretofore constructed these knuckle joint connections have been on the order of frictional bearings. One object of the present invention is to produce an improved knuckle joint connection so constructed and arranged as to reduce the wear and friction in the pivotal joint to a minimum. Another object of the invention is to construct a knuckle joint connection so as to facilitate the machining of the parts and thereby increase the accuracy of workmanship and reduce the cost of production. A further object of the invention is to arrange the parts of the knuckle joint connection in such a way as to facilitate the assembly or disassembly of the parts. To the accomplishment of these objects the invention consists in the improved knuckle joint connection hereinafter described and particularly pointed out in the appended claims.

In the accompanying drawings illustrating the preferred form of the invention, Fig. 1 is a side elevation, partly in section, of a piston and an eccentric strap employing the improved knuckle joint connection; Fig. 2 is a longitudinal section taken through the knuckle joint connection; Fig. 3 is a section taken on the line 3—3 of Fig. 2; Fig. 4 is an enlarged longitudinal section through a modified form of knuckle joint connection embodying the invention; and Fig. 5 is a view similar to Fig. 4 of a second modified form of connection.

The improved knuckle joint connection, as illustrated in Figs 1, 2 and 3, comprises a case-hardened wrist pin 7 (preferably hollow), which is adapted to be positioned in a transverse hole in the upper end or head 8 of the eccentric strap 9, the ends of the wrist pin projecting from the sides of the head of the eccentric strap and being adapted to fit within the ends of a transverse bore 10 formed in the lower part or skirt 11 of the piston 12. The pivotal connection between the eccentric strap and the piston is made by providing a tight fit between the projecting ends of the wrist pin and the bore 10 of the piston and an anti-friction bearing between the head of the eccentric strap and the middle portion of the wrist pin. This anti-friction bearing, which is generally indicated at 14, may be of any usual or preferred construction and comprises two sets of ball bearings arranged side by side and consisting of the outer shells or race-ways 15 adapted to fit within the transverse hole in the head of the eccentric strap, two inner shells or race-ways 16 (only one being shown in Fig. 1) adapted to fit on the middle portion of the wrist pin, and the ball bearings 17.

The hole or bore in the head 8 of the eccentric strap in which the outer shells or race-ways 15 of the anti-friction bearings are fitted, is prepared by boring the hole to a diameter which is .001" less than the outside diameter of the outer race-ways. This bored hole is then rolled or ground until its diameter is .0005" less than the outside diameter of the outer race-ways 15. The upper part of the head 8 of the eccentric strap is then slotted, as at 18. By slotting the upper segment of the head 8 of the eccentric strap, a clamping effect on the outer race-ways 15 is secured. This clamping effect by the split head of the eccentric strap upon the pin prevents the pin from turning and thereby eliminates wear and at the same time compensates for any "peening" action between the pin and the head of the strap. By rolling or grinding the bored hole the slight irregularities in the machined surface are flattened out so that the peening effect between the race-ways and the bore in the head of the eccentric strap is reduced to an almost negligible minimum, which is compensated for by the clamping effect of the sides of the head of the eccentric strap.

The transverse hole or bore 10 in the lower or skirt portion 11 of the piston 12 is prepared for the projecting ends of the wrist pin 7 by boring the hole to approximately .002" less in diameter than the diameter of the ends of the wrist pin. The lug-like portions 21 of the skirt 11 which are formed between the vertically arranged openings 22 in the skirt 11, are then slotted, as at 24, so that the two parts of which each lug is now composed will have a clamping effect upon the wrist pin. This clamping effect as explained above will compensate for any wear or lost motion which may develop between the ends of the wrist pin and the bore 10.

In assembling the piston and eccentric strap by means of the improved knuckle joint connection shown in Figs. 1, 2 and 3, the anti-friction bearings 14 are first placed in position in the head of the eccentric strap. This is done by tapping the anti-friction bearings lightly, thereby springing out the sides of the head slightly. The head of the eccentric strap is then inserted up into the recess 26 in the lower end of the piston, the bosses 27 on the inner sides of the lugs 21 serving to center the head 8 of the eccentric strap in the piston. When the axis of the hole in the inner race-ways 16 is coincident with the axis of the bore 10 in the piston the wrist pin 7 is tapped into place.

In the form of knuckle joint connection shown in Fig. 4, the head 29 of the eccentric strap 30 fits loosely within the recess 31 of the lower or skirt portion 32 of the piston 33. The transverse hole or bore 34 in the head portion 29 of the strap 30 is machined to .002" less in diameter than the outside diameter of the outer shells or race-ways 35 of the pair of anti-friction bearings generally indicated at 37. The machined hole or bore 34 is then rolled or ground until it is .001" greater in diameter than the diameter of the race-ways 35. This provides a sucking fit between the outer race-ways 35 and the head of the eccentric strap. The anti-friction bearings are held in place by the snap rings 38 which fit into grooves in the outer edges of the hole or bore 34.

The wrist pin in this form of knuckle joint connection consists of a large portion or head 40, a reduced middle portion 41 and a still further reduced end portion 42. On the middle portion 41 the inner shells or race-ways 43 of the anti-friction bearings are adapted to seat. Located between the inner race-ways 43 and the outer race-ways 35 are the rollers 44 which are held in place by snap rings 45. The head of the wrist pin is adapted to fit in the left hand end of the bore 46 formed transversely in the skirt portion 32 of the piston. The wrist pin is held in position by means of a set screw 47, the inner end of which is received in a hole 48 in the head of the wrist pin. A check nut 49 holds the set screw in place. Between the reduced end 42 of the wrist pin and the right hand section of the bore 46 is a bushing 50 which is held in position by a set screw 51, the inner edge of which fits in a hole in the bushing. The check nut 52 secures the set screw in place. The inner end of the head portion 40 of the wrist pin and the inner end of the bushing 50 bear against the outer sides of the two inner race-ways 43 and so hold the pair of anti-friction bearings and the head of the eccentric strap centered.

The form of knuckle joint connection shown in Fig. 5 is substantially the same in construction and arrangement as the knuckle joint connection shown in Fig. 4, except that the sliding bushing 50 held in position by the set screw 51 is replaced by the threaded bushing 54 which is screwed into the threaded right hand part 55 of the bored hole 56. The outer end of the threaded bushing 54 is provided with holes 57 to accommodate a spanner wrench. The other parts of the knuckle joint connection shown in Fig. 5 being the same in construction as the corresponding knuckle joint parts shown in Fig. 4 are given the same reference numerals.

Having thus described the invention what I claim as new is:—

1. A knuckle joint connection between a piston and a member having its head portion received within a recess in the piston comprising a pin having its ends extending laterally from each side of the head portion of the member, said ends being adapted to be received in a transverse bore in the piston, the sides of the bore in the piston being constructed and arranged to exert a clamping effect upon the pin, and an anti-friction bearing between the head of the member and the middle portion of the pin.

2. A knuckle joint connection between a piston and a member the head portion of which is adapted to be received in a recess of the skirt of the piston comprising, a wrist pin positioned in the head portion of the member with its ends extending laterally therefrom, said end portions of the pin being adapted to be received in a transverse bore in the skirt of the piston, and an anti-friction bearing between the head of the member and the middle portion of the wrist pin.

3. A knuckle joint connection between a piston and an eccentric strap whose head portion is adapted to be received within a recess in the piston comprising, a wrist pin positioned in the head of the strap and having its ends extending laterally from the sides of the head of the strap, said ends being adapted to be received in a transverse bore in the piston, and an anti-friction bearing between the head of the strap and the middle portion of the pin, the sides of the head being arranged to exert a clamping effect on the outer race-ways of the anti-friction bearings.

4. A knuckle joint connection between a piston and an eccentric strap, the head portion of which is adapted to be received within a recess in the piston, the head of the strap being provided with a transverse bore having its upper wall slotted, a wrist pin positioned in the transverse bore in the head of the strap having its ends projecting laterally from the sides of the head of the strap to be received in a transverse bore in the piston, and an anti-friction bearing between the split head of the strap and the middle portion of the wrist pin.

5. A knuckle joint connection between a piston and an eccentric strap the head of which is adapted to be received within a recess in the skirt of the piston comprising a pin positioned in a transverse bore in the head of the strap, an anti-friction bearing mounted on the middle portion of the pin, the outer race-ways of the anti-friction bearing being seated in the transverse bore in the head of the strap, the sides of the bore being flexible to exert a clamping effect on the outer race-ways of the anti-friction bearing, the end portions of the wrist pin extending laterally from the sides of the head of the strap and being received in a transverse bore in the skirt of the piston, the sides of the bore being made flexible to effect a clamping effect on the ends of the pin.

6. A knuckle joint connection between a piston and a member having its head portion received within a recess in the piston comprising, a pin positioned in a transverse bore in the head of the member and connected therewith by an anti-friction bearing, the ends of the wrist pin extending laterally from each side of the head portion of the member to be received in a transverse bore in the piston.

ELMER LOWE.